United States Patent
Barman et al.

(10) Patent No.: US 8,924,455 B1
(45) Date of Patent: Dec. 30, 2014

(54) MULTIPLICATION OF MATRICES USING SYSTOLIC ARRAYS

(75) Inventors: Kaushik Barman, Hyderabad (IN); Parag Dighe, Hyderabad (IN); Ragahavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 980 days.

(21) Appl. No.: 13/035,600

(22) Filed: Feb. 25, 2011

(51) Int. Cl.
 *G06F 7/52* (2006.01)

(52) U.S. Cl.
 USPC .......................................... 708/607

(58) Field of Classification Search
 CPC .............................. G06F 15/8046; G06F 17/16
 USPC ......................................... 708/522, 607, 609
 See application file for complete search history.

(56) References Cited

U.S. PATENT DOCUMENTS

| | | | |
|---|---|---|---|
| 4,493,048 A | 1/1985 | Kung et al. | |
| 4,686,645 A | 8/1987 | McCanny et al. | |
| 4,697,247 A | 9/1987 | Grinberg et al. | |
| 4,777,641 A * | 10/1988 | Inagaki et al. | 378/34 |
| 4,922,418 A * | 5/1990 | Dolecek | 714/51 |
| 5,274,832 A * | 12/1993 | Khan | 708/424 |
| 6,055,556 A | 4/2000 | Barak et al. | |
| 7,321,915 B2 | 1/2008 | Lee | |

OTHER PUBLICATIONS

Chen "Synthesizing Systolic Arrays form Recursion Equations", 26 pages, 1987.*
Di Zitti, E., et al., *Efficient technique for partitioning and programming linear algebra algorithms on concurrent VLSI architectures*, IEE Proc-Circuits Devices Syst., vol. 142, No. 2, Apr. 1995, pp. 97-104.
EECC756—Shaaban, *Systolic Architectures*, Lec 1, Spring 2003, Mar. 3, 2003, pp. 1-9, http://www.cs.hmc.edu/courses/2001/spring/cs156/.

* cited by examiner

*Primary Examiner* — Chuong D Ngo
(74) *Attorney, Agent, or Firm* — LeRoy D. Maunu

(57) ABSTRACT

In one embodiment, a matrix multiplication circuit is provided. The circuit includes a plurality of systolic arrays, a pre-processing circuit, and a post-processing circuit. The pre-processing circuit is configured to receive first and second input matrices, and decompose the first input matrix into a plurality of sub-matrices. The pre-processing circuit inputs each of the plurality of sub-matrices to at least a respective one of the plurality of systolic arrays for multiplication with the second input matrix. The post-processing circuit is configured to combine output of the systolic arrays into a result matrix.

13 Claims, 16 Drawing Sheets

$x_{out} = x_{in}$
$y_{out} = y_{in}$
$c = c_{prev} + x_{in} * y_{in}$

US 8,924,455 B1

MULTIPLICATION OF MATRICES USING SYSTOLIC ARRAYS

FIELD OF THE INVENTION

One or more embodiments generally relate to arithmetic processing of matrices of data, and more particularly to the multiplication of matrices.

BACKGROUND

Modern signal and image processing systems often perform arithmetic processes on matrix datasets. One fundamental matrix operation is matrix multiplication. Matrix multiplication has numerous applications such as image and video processing, radar and sonar signal processing, and in multi-dimensional data analysis. These applications may require flexible implementation providing a wide range of throughput (or conversion rate, measured in number of matrix multiplications performed per unit time) requirements. Such requirements can be difficult to implement while making optimum use of the system resource.

SUMMARY

In one embodiment, a matrix multiplication circuit is provided. The circuit includes a plurality of systolic arrays, a pre-processing circuit, and a post-processing circuit. The pre-processing circuit is configured to receive first and second input matrices, and decompose the first input matrix into a plurality of sub-matrices. The pre-processing circuit inputs each of the plurality of sub-matrices to at least a respective one of the plurality of systolic arrays for multiplication with the second input matrix. The post-processing circuit is configured to combine output of the systolic arrays into a result matrix.

In another embodiment, a method for generating an optimal systolic array for matrix multiplication is provided. An optimal decomposition of first and second input matrices into sub-matrices is selected and an optimal multiplication of sub-matrices is selected based on criteria including, a throughput requirement, and dimensions of the first and second input matrixes. A pre-processing circuit is generated, the pre-processing circuit being configured to decompose the first and second input matrices into a set of sub-matrices according to the selected decomposition. The pre-processing circuit is also configured to input the set of sub-matrices to the number of systolic arrays according to the selected multiplication of sub-matrices. A post-processing circuit is generated, the post-processing circuit being configured to construct a result matrix from the output of the one or more systolic arrays according to the selected multiplication of sub-matrices.

In yet another embodiment, a circuit for complex multiplication of matrices is provided. The circuit includes a first systolic array for computing real components and a second systolic array for computing imaginary components. The first systolic array includes M rows and 2*L columns of processing cells (PC). Each row of the first systolic array includes a first number of PCs configured to compute a first dot product of real components of a column of a first matrix and a row of a second matrix. Each row also includes a second number of PCs following the first number of PCs, the second number of PCs being configured to subtract a second dot product of imaginary components of the column of the first matrix and the row of the second matrix from the first dot product.

The second systolic array has M rows and 2*L columns of PCs. Each row of the second systolic array includes a third number of PCs configured to compute a first dot product of real components of the column of a first matrix and imaginary components of the row of a second matrix. Each row of the second systolic array also includes a fourth number of PCs following the first number of processing cells. The second number of PCs is configured to add a second dot product of imaginary components of the column of the first matrix and real components of the row of the second matrix to the first dot product.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

A systolic array is an interconnected matrix of individual processing units, or "cells," where the cells process individual elements of an input matrix and exchange processed output to perform an overall operation. Systolic arrays are advantageous because several operations may be performed in parallel to achieve high throughput. For many applications, such throughput may not be required. One or more embodiments provide a systolic array multiplication circuit that is configurable to multiply input matrices of various dimensions at various throughput requirements with an objective of optimal in resource utilization.

Multiplication of two matrices of compatible sizes is defined as C=A×B, where A and B are of sizes M×L and L×N respectively and C is of size M×N. The elements of C are computed as $$c_{ij} = \sum_{k=1}^{L} a_{ik} b_{kj}$$

Computation of the product matrix can be written in the form of three nested loops. The pseudo-code for this computation can be expressed as:

```
for (i = 1 to M)
    for (j = 1 to N)
        c_ij = 0;
        for (k = 1 to L)
            c_ij = c_ij + a_ik * b_kj;
        end k;
    end j;
end i;
```

As illustrated in the above pseudo-code, the number of operations being performed is: M*N*L multiplications and M*N*(L−1) additions. As a result, M*N*L multiply-and-accumulate (MAC) units (or operations) are required to perform a general A*B matrix multiplication.

In one or more embodiments, a multiple systolic array structure is provided that has a throughput capable of completing multiplication of two input matrices each cycle of operations. For applications that do not require such high throughput, the structure is adaptable to perform multiplication operations using the least number of processing resources for a specified throughput tolerance.

Figure 1:
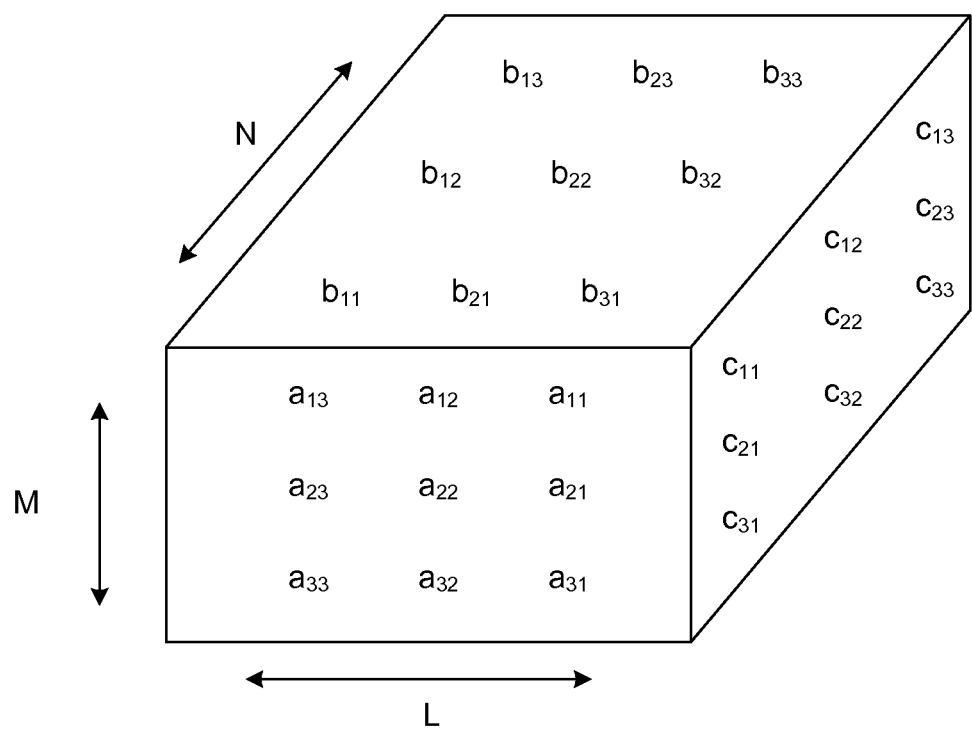
FIG. 1 illustrates a three-dimensional model of the multiplication of two matrices.

The embodiments may be explained with reference to a 3-dimensional model of the multiplication of two 2-dimensional matrices. FIG. 1 shows a 3-dimensional cuboid with three faces ($F_{front}$, $F_{top}$, and $F_{side}$) respectively representing input matrix A, input matrix B, and result matrix C in M, N, and L dimensions. In one or more embodiments, multiplication is partitioned in the N dimension for parallel processing. Each column of matrix B, may be separately multiplied with matrix A to generate one column of result matrix C. N systolic arrays can be formed by decomposing the cuboid along the N-dimension. Each of these N systolic arrays takes the shape of matrix A (or same as the face $F_{side}$).

Figure 2:
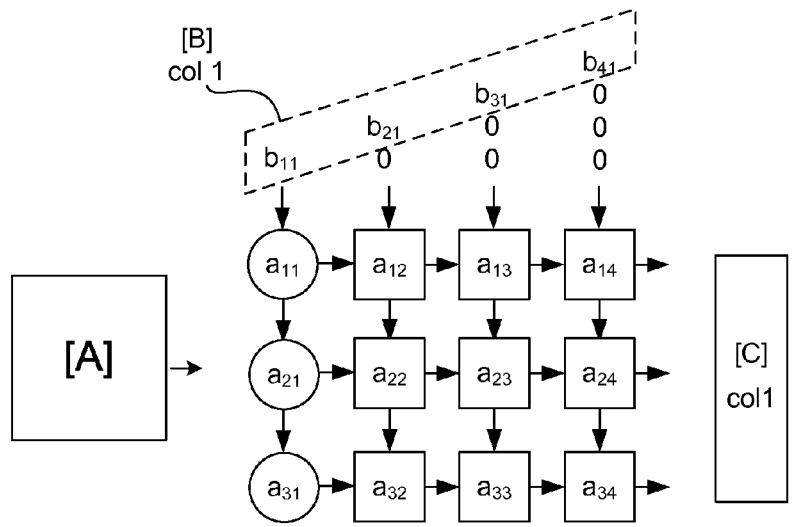
FIG. 2 shows a configurable systolic array structure for multiplication of matrices.
Figure 3:
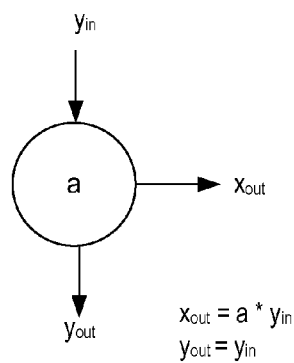
FIG. 3 shows a boundary processing cell of the systolic array shown in FIG. 2.
Figure 4:
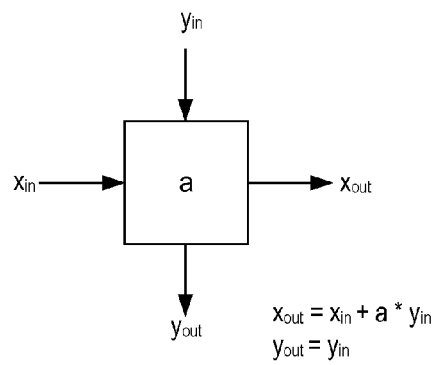
FIG. 4 shows an internal processing cell of the systolic array shown in FIG. 2.

FIG. 2 shows an example systolic array configured to perform partial matrix multiplication. The systolic array includes M rows and L columns of processing cells (PCs). Each row is configured to compute a dot product of components of a column of input matrix B and a row of an input matrix A. Each row includes a boundary processing cell followed by L−1 internal processing cells. FIG. 3 and FIG. 4 show respective structures of boundary and internal processing cells. The boundary processing cells are configured to perform multiplication only and internal processing cells perform multiply and accumulate (MAC) operations. Data flows through the array of cells top to bottom as well as from left to right as shown in FIG. 2.

It is recognized that the elements of the input of matrix elements may need to be delayed as appropriate to compensate for propagation delay incurred within the systolic array. For example, elements of the column of matrix B are offset with an appropriate number of initial zeros to compensate for the propagation delay. The first systolic array outputs the first column of C. As in the case of input from matrix B, there also will be delays due to propagation through the systolic array. For example, the last element of the first column of C will come after M−1 unit delays measured from the first element (as shown in FIG. 2). Likewise, second systolic array will receive the second column of matrix B as input and will produce the second column of result matrix C at the output.

Figure 5:
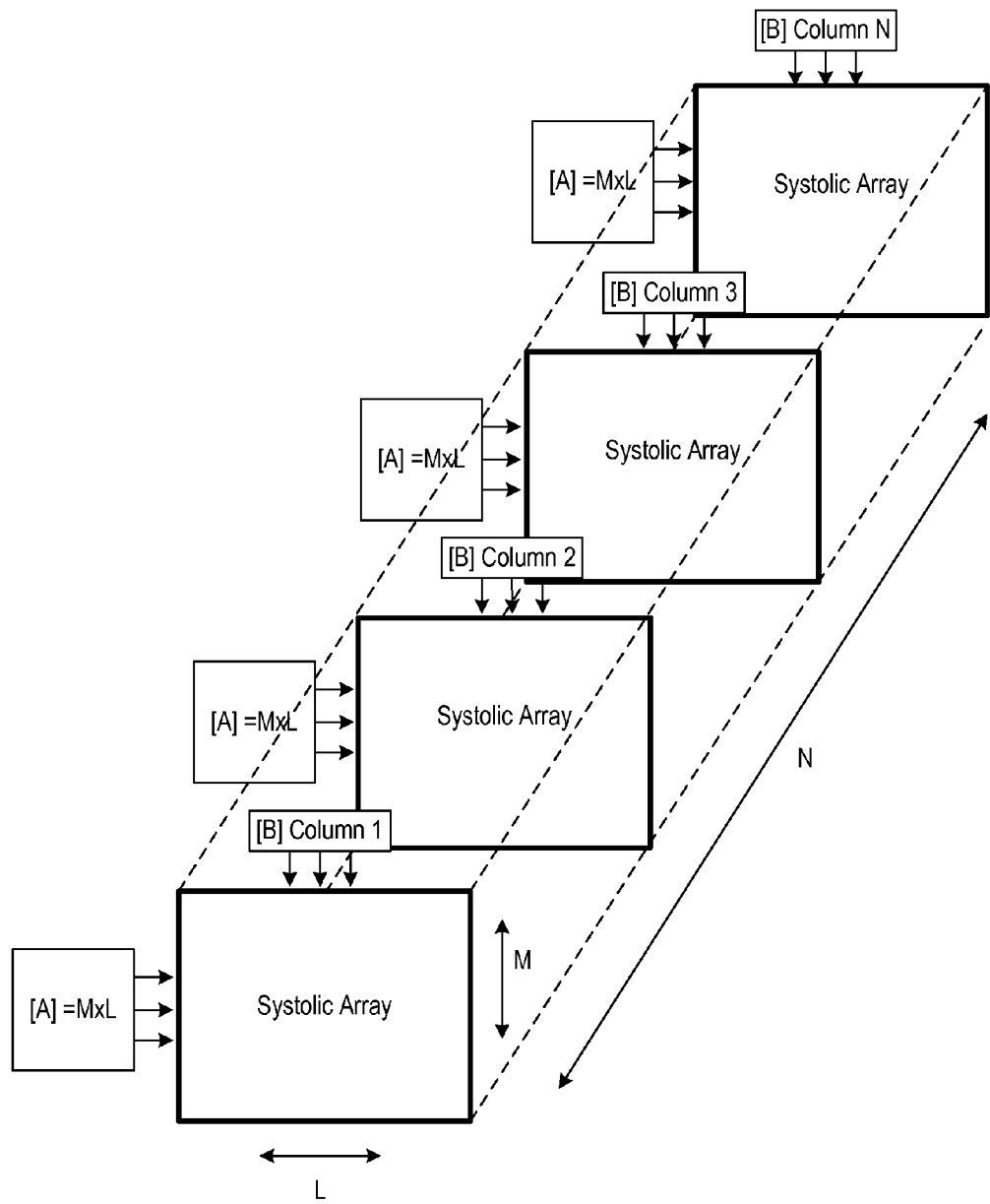
FIG. 5 shows a structure including multiple systolic arrays configured for matrix multiplication.

After an initial latency, the systolic array exhibits a throughput that performs M*L MAC operations per cycle to produce one column of the output matrix every cycle. In one embodiment, a plurality of systolic arrays are utilized to process columns in parallel. If N systolic arrays are included in the multiplication circuit (i.e., one for each column in matrix B), the multiplication of two matrices can be completed every cycle. FIG. 5 shows an example multiplication circuit having a plurality of the arrays illustrated in FIG. 2. When the plurality of systolic arrays includes one systolic array for each column in matrix B, the circuit is referred to as fully parallel. The fully parallel arrangement may also be referred to as the base architecture as used herein.

After an initial latency, the fully parallel architecture performs M*N*L MAC operations each cycle. This results in the highest throughput, capable of completing multiplication of two matrices each cycle. In some implementations, the base architecture may be modified to reduce the number of processing cells, using each processing cell to serially perform several MAC operations in the multiplication of two matrices. As a result, processing resources may be reduced at the expense of reduced throughput. The lowest throughput completes multiplication of two matrices every M*N*L cycles, where one MAC operation is completed in each cycle.

When design applications have lower throughput requirements, the number of processing resources needed to implement the systolic array may be reduced by sequentially performing multiple MAC operations on each processing cell. This is referred to as folding herein. The systolic array structure that uses the minimum number of processing cells while meeting throughput requirements is referred to as optimal. As used herein, the resource reuse factor (F) refers to the maximum number of cycles that are tolerable between completed multiplications of matrices. This factor F also generally indicates how many times a processing cell in the structure is reused to perform different MAC operations in the multiplication of two matrices when optimal folding is implemented.

Folding can be performed along the M dimension, along the N dimension, along the L dimension, in any combination thereof. The systolic structure shown in FIG. 5, may be configured to perform folding along the along M dimension or along N dimension, or any combination thereof. When folding is performed along M dimension, the number of rows of processing cells included in each 2-D systolic array is reduced to $$\text{ceil}\left(\frac{M}{F}\right) \text{ rows,}$$

where ceil( ) indicates ceiling operation, i.e., smallest integer greater than $$\frac{M}{F}$$

Figure 6:
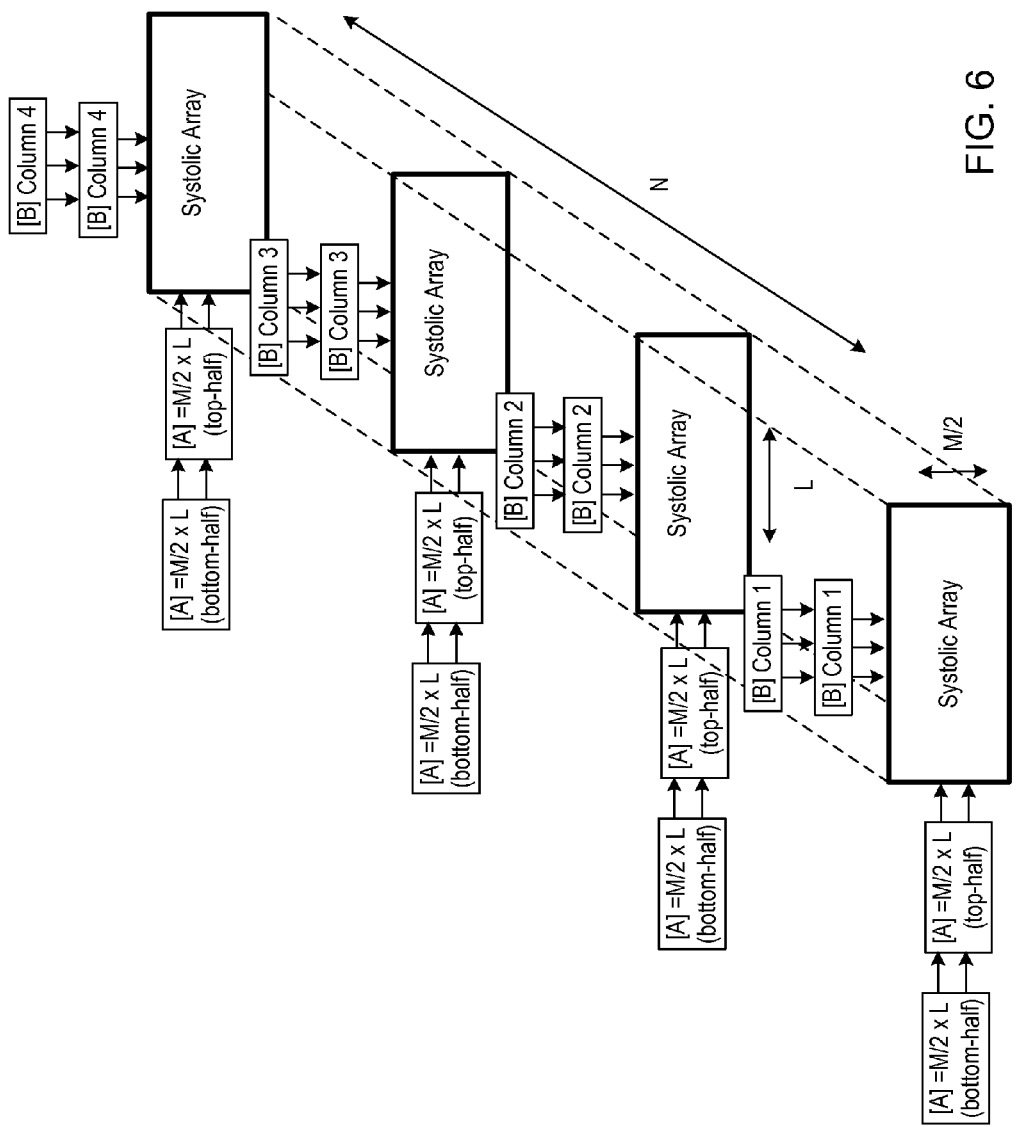
FIG. 6 shows another example configuration of the systolic array structure of FIG. 5 for folding input matrices in the M-dimension.

FIG. 6 illustrates the multiplication circuit of FIG. 5 folded along the M dimension by a folding factor of two. Each systolic array is halved row-wise keeping rest of the formation unchanged. In this folded structure, each row of a systolic array will process F rows of matrix A, and the systolic array will produce partial C columns $$\left(\text{ceil}\left(\frac{M}{F}\right) \text{elements}\right)$$

per clock cycle requiring F cycles (F=2 in this example) to produce the full column. Thus, the number of processing cells in the entire multiplication circuit is reduced to $$\text{ceil}\left(\frac{M}{L}\right)NL,$$

and each of them is utilized a maximum F times to produce the output matrix C over F clock cycles.

Figure 7:
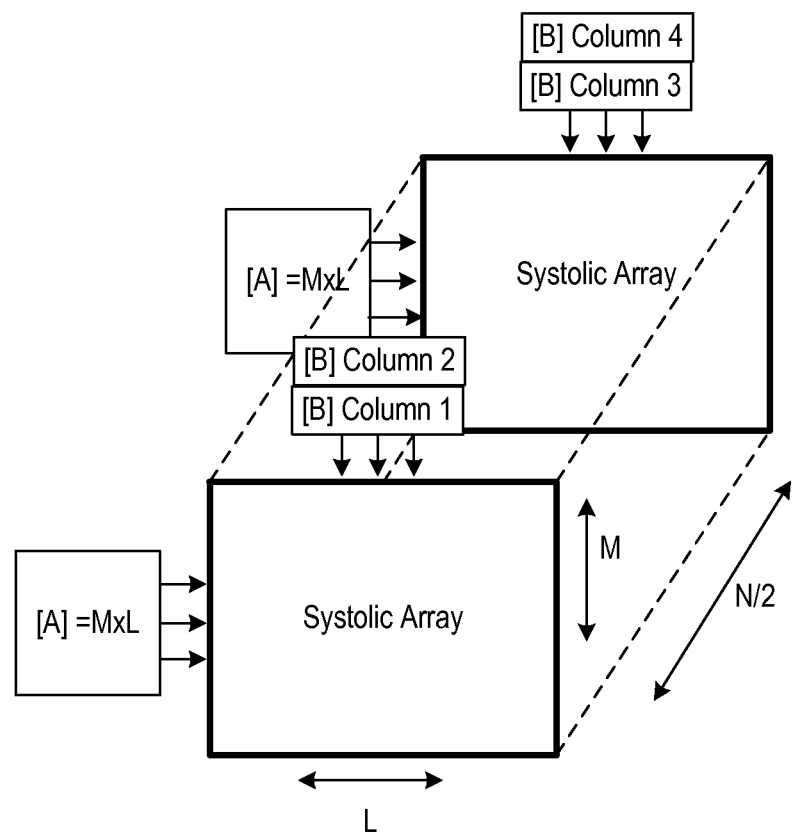
FIG. 7 shows the systolic array structure of FIG. 5 configured to fold input matrices in the N-dimension.

FIG. 7 shows the multiplication circuit of FIG. 5 folded along N dimension. When folded along N dimension, multiple columns of B are input to each systolic array one after another and the number of 2-D systolic arrays required is reduced to $$\text{ceil}\left(\frac{N}{F}\right).$$

Unlike in folding along M dimension, 2-D systolic arrays will not shrink here and will have full size of M×L as shown in FIG. 5. Each of the systolic arrays will process F columns, reusing each processing cell F times, before multiplication of the input matrices A and B is completed. However, when N is not evenly divisible by F, the last systolic array will process less than F columns. The F columns per systolic array will get processed in F clock cycles (at the rate of one column per clock cycle), each array producing F columns of C over the same number of clock cycles. The total number of processing cells is reduced to $$\text{ceil}\left(\frac{N}{F}\right)ML.$$

Figure 8:
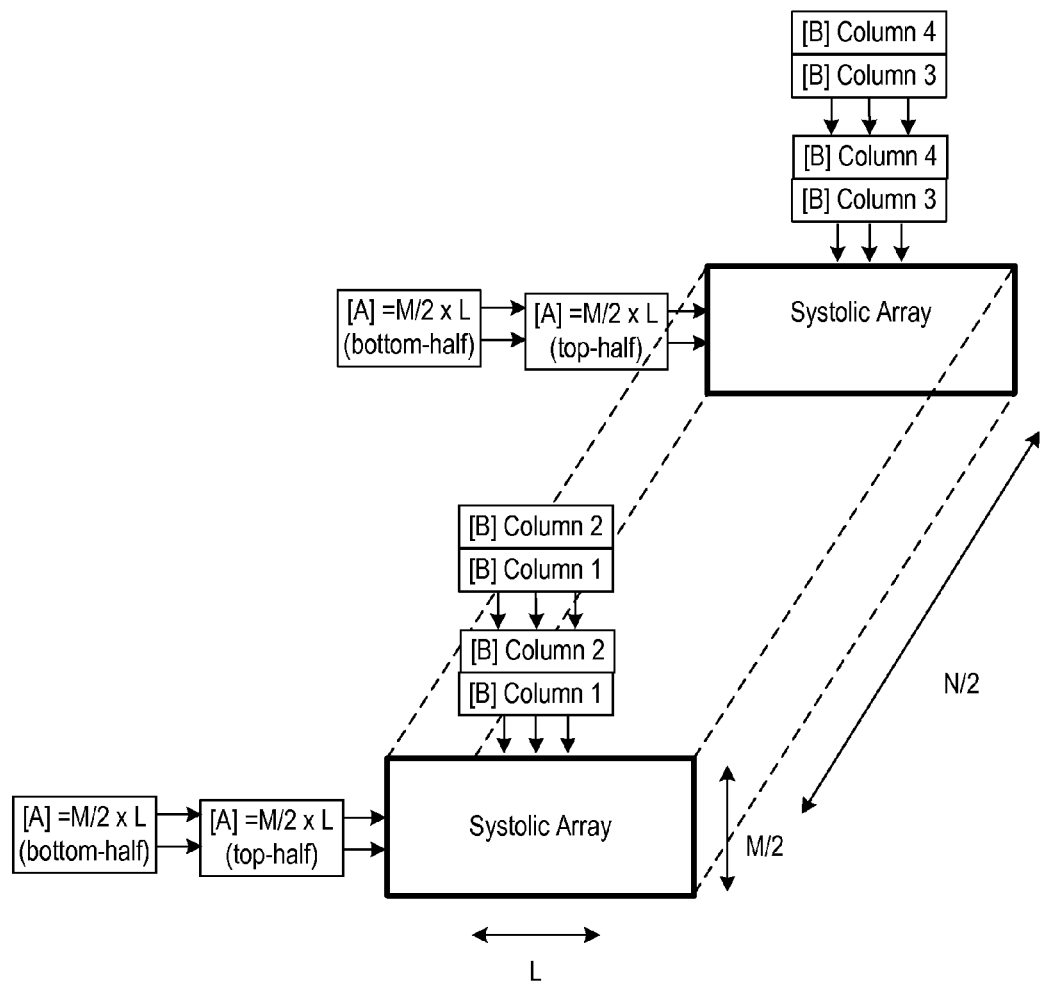
FIG. 8 shows an example configuration of the systolic array structure of FIG. 7 to fold input matrices in the M and N dimensions.

The multiplication circuit may also be implemented using a hybrid of these two folding strategies, folding the input arrays along both N and M dimensions. FIG. 8 illustrates the multiplication circuit shown in FIG. 5 folded in each of the M and N dimensions by a folding factor of 2. This approach is useful when F>max(M, N). Thus, if F can be factorized into two greatest integers $k_1$ and $k_2$ such that, $F \geq k_1 k_2$ and $M \geq k_1$, $N \geq k_2$, then folding by F can be realized as a hybrid of folding by a factor of $k_1$ along M dimension followed by folding by a factor of $k_2$ along N dimension. In such an implementation, the total number of processing cells is reduced to $$\text{ceil}\left(\frac{M}{k_1}\right)\text{ceil}\left(\frac{N}{k_2}\right)L.$$

In this formation, each systolic array having $$\text{ceil}\left(\frac{M}{k_1}\right) \text{rows}$$

will produce a single column of C over $k_1$ clock cycles. Each systolic array will also have $k_2$ stacked up columns of B to produce the same number of columns of C over a total of $k_1 k_2$ clock cycles.

For various matrix dimensions and required throughput F, one folding strategy may require fewer processing cells to implement the multiplication circuit in comparison to other folding strategies. For example, if M=3, N=2, L=4 and F=3, folding along M will be a better option (using 8 MAC units) than folding along N (using 12 MAC units). However, if F=2, then for the same M, N and L, folding along N will be a better choice. In comparison, when the folding factor is increased to F=7, the hybrid folding strategy can be used with the factorization $k_1$=3, $k_2$=2 to provide a multiplication architecture that utilizes only 4 processing cells (i.e., M/3*N/2*L=1*1*4).

Figure 9:
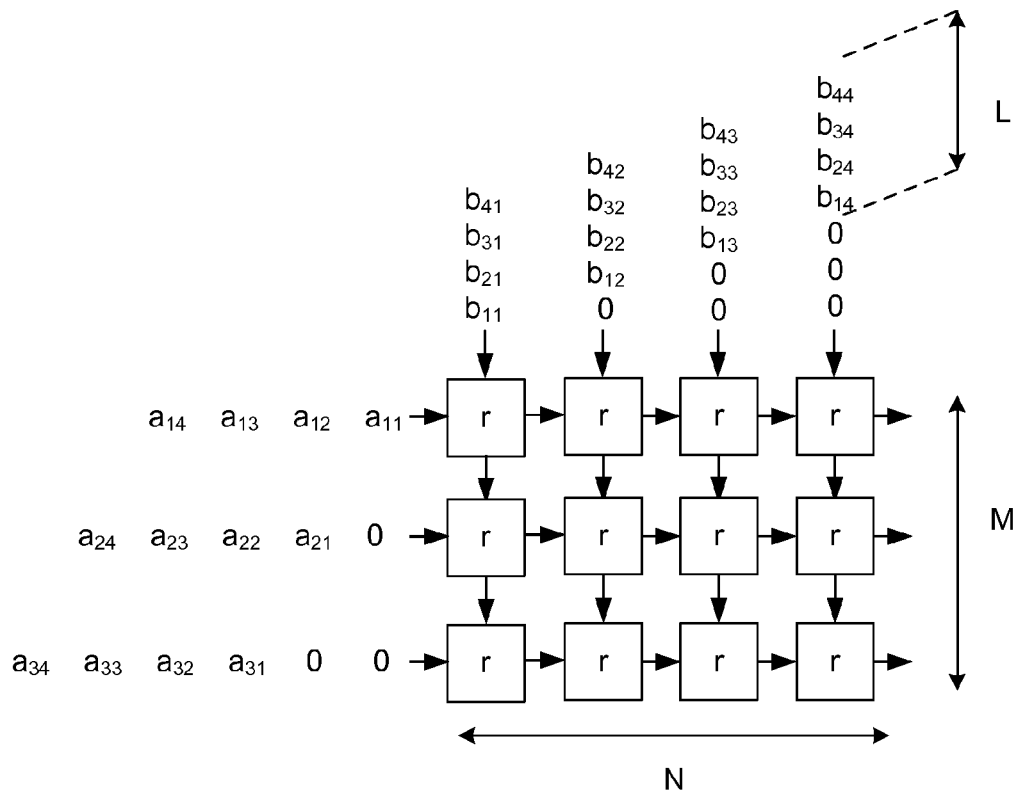
FIG. 9 illustrates a systolic array configured to fold the input arrays in the L dimension.

While the base architecture shown in FIG. 5 may be folded in the M and N dimensions to produce optimal resource utilization for F≤MN, folding cannot be performed in the L dimension without disrupting the systolic operation. However, for higher values of F and for multiples of L, folding along the L dimension may be necessary in order to achieve optimal use of processing resources. FIG. 9 shows an alternative systolic array architecture in which processing of the input matrices is folded in the L dimension. Unlike folding along M or N, folding along L is not partial. Rather, folding is performed fully in the L dimension, so that the number of PCs becomes M*N after full folding along L. This systolic array corresponds to folding factor L with MN MAC units with (i,j)-th element producing $c_{ij}$ by processing the i-th row of A matrix and the j-th column of B matrix. In this architecture, each column of the B matrix is input into a column of the systolic array and each row of the input matrix A is input from the left into a respective row of the systolic array.

Figure 10:
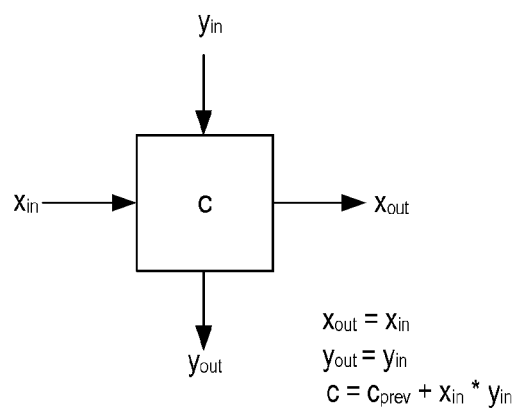
FIG. 10 illustrates a tail processing cell shown in the systolic array shown in FIG. 9.

FIG. 10 shows a processing cell used to implement the systolic array shown in FIG. 9. The processing cell is configured to accumulate the product of values $x_{in}$ received from the B matrix multiplied with values $y_{in}$ received from the A matrix. Values $x_{in}$ and $y_{in}$ are respectively propagated to the right and down through the systolic array as shown. After L cycles, the accumulated value c is trained with a portion of the result matrix C. The trained values may be collected from all the processing cells in parallel. In some implementations, a control signal is input to the PC after every L cycle (to indicate the first element of a new row/column is being input) to first data element so that for the first element accumulator C will be initialized. In this manner, no intermediate reset is necessary.

Figure 11:
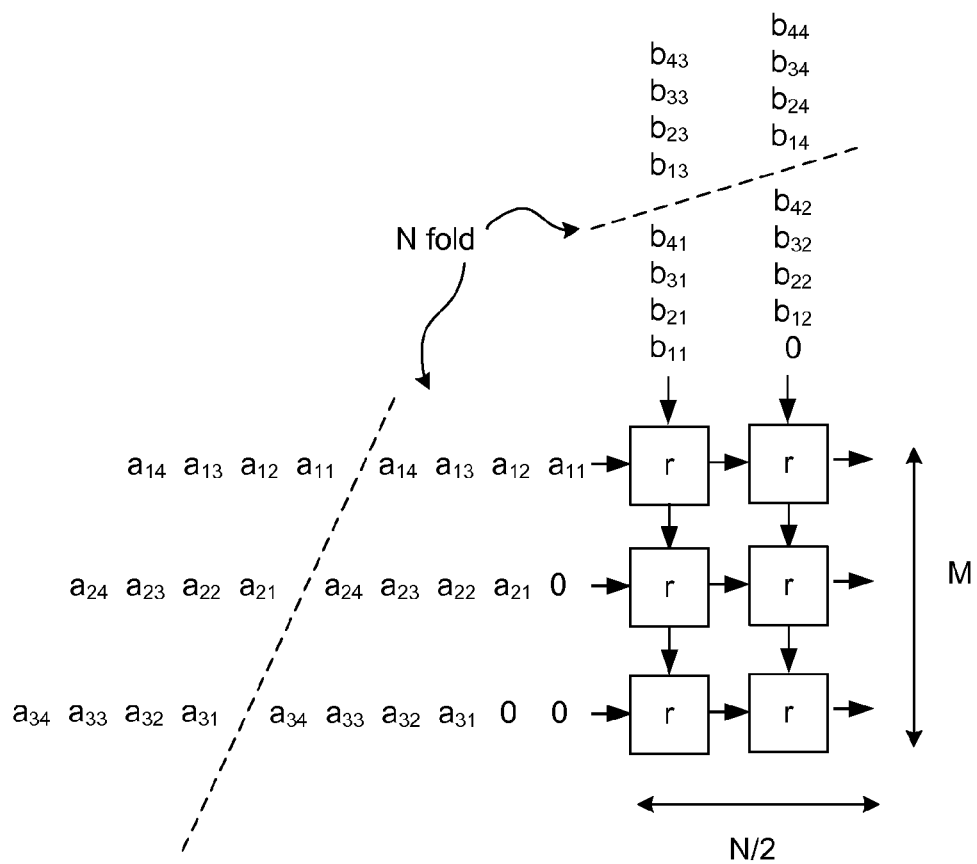
FIG. 11 illustrates the systolic array shown in FIG. 9 further configured to fold input arrays along the N dimension.
Figure 12:
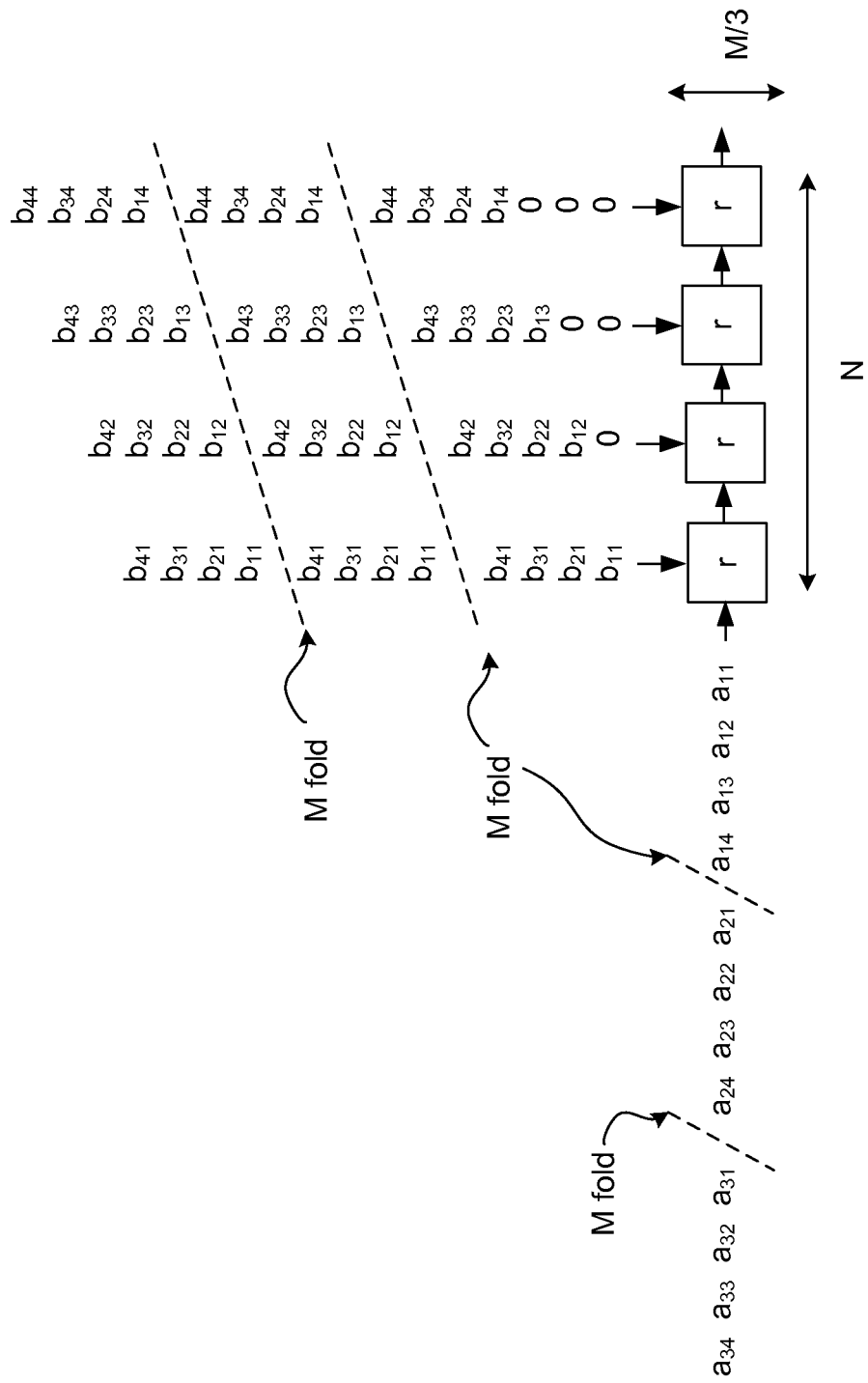
FIG. 12 illustrates the systolic array shown in FIG. 9 further configured to fold input arrays along the M dimension.

This architecture has a throughput that completes multiplication of two matrices every L clock cycles. For higher values of F, folding along M and folding along N may also be performed in the manner described in relation to the systolic array shown in FIG. 2. For example, FIG. 11 shows the systolic array of FIG. 9 further folded by a factor of 2 in the N dimension. Alternatively, FIG. 12 shows the systolic array of FIG. 9 folded by a factor of three in the M dimension. The example multiplication criteria (M=3, N=4, L=4) F=12 can be optimally satisfied by fully folding along L as shown in FIG. 9 and further folding by 3 along M. As a result, only four processing cells are required to perform the matrix multiplication and complete one multiplication every F cycles.

Figure 13:
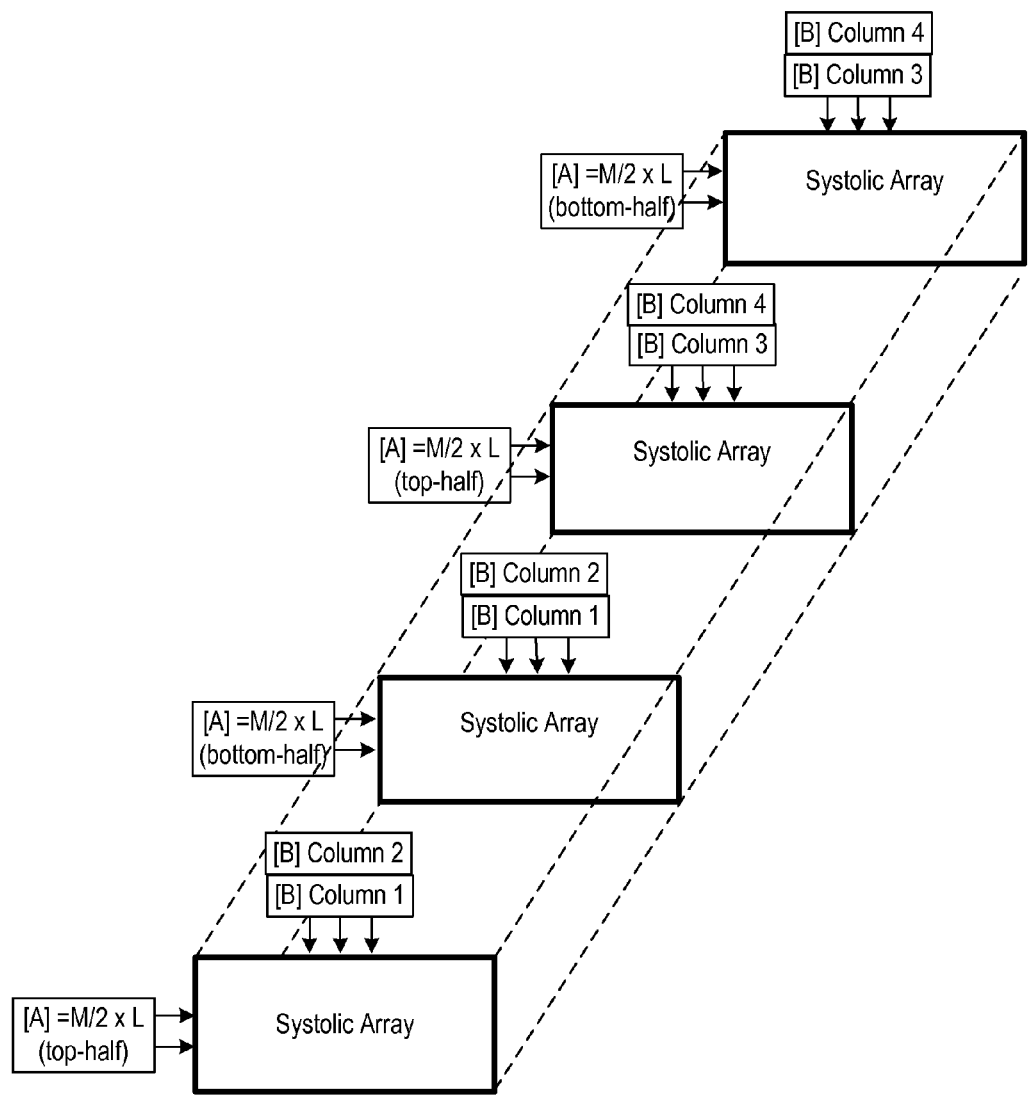
FIG. 13 shows an example alternate configuration of the systolic array structure of FIG. 6 for folding input matrices in the N dimension.

While the embodiments and examples herein are primarily described in relation to the M by L systolic arrays shown in FIG. 2 and FIG. 9, multiple systolic arrays of other dimensions may be used as well to perform equivalent multiplication using the same number of processors. For example, FIG. 13 shows an alternative arrangement of the folded systolic array shown in FIG. 7. In this example, each systolic array from FIG. 7 is split horizontally into two systolic arrays, a first of which processes a top half of matrix A and a second of which processes the bottom half of matrix A. Other alternative arrangements of the processing cells of each systolic array may be implemented as well. Similarly, the single systolic array shown in FIG. 10, may be implemented using multiple systolic array arranged in parallel in a configuration similar to that shown in FIG. 5. For example, rather than folding in the N dimension as illustrated in FIG. 12, the systolic array may be split into two of the 3×2 systolic arrays shown in FIG. 12, which are arranged and processed in parallel.

Figure 14:
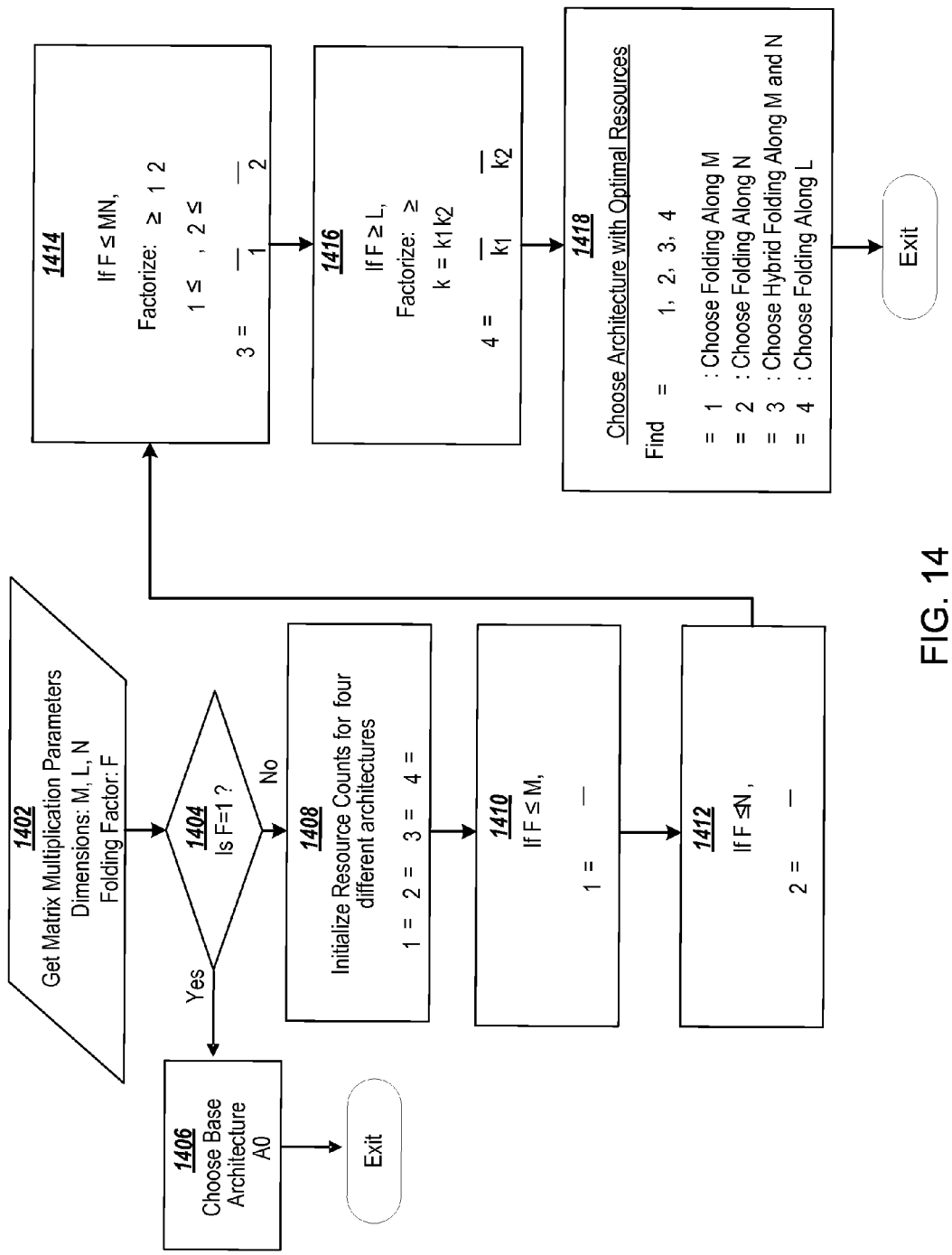
FIG. 14 shows a flowchart of an example process for determining a folding for a set of matrix multiplication parameters.

FIG. 14 shows a flowchart of an example method for determining an optimal folding strategy for a given set of matrix multiplication parameters. Matrix multiplication parameters are received at 1402. The multiplication parameters include the dimensions of the input matrices (M, L, and N) and a folding factor F indicating the maximum allowed number processing cycles to complete multiplication of the input matrices.

If F=1 at decision block 1404, the base architecture shown in FIG. 5 is selected at block 1406 to fully process input matrices in parallel. Otherwise, alternative architectures for the folding strategies are analyzed to determine a minimum number of resources required for implementation. The folding strategy that requires the least number of resources will be selected to implement the multiplication circuit. The selected folding strategy indicates how input matrices will be decomposed into submatrices and the order in which submatrices are to be multiplied to produce a result matrix.

In this example, four possible folding strategies are analyzed: 1) folding in the M dimension, 2) folding in the N dimension, 3) folding in both N and M dimensions, and 4) folding in either N or M dimensions in addition to fully folding in the L dimension.

A resource counter for each respective architecture (R1, R2, R3, R4) is initialized to the maximum number of resources (i.e., M*N*L) at block 1408. The minimum number of required resources for architectures folded in the M dimension and the N dimension are respectively determined at blocks 1410 and 1412. The resource calculation for each of these architectures is determined by dividing the number of columns or rows in the respective dimension by the folding factor F. For example, If F≤M, $$R_1 = \text{ceil}\left(\frac{M}{F}\right)NL.$$

If F>M, the M dimension is fully folded and the number of resources $R_1$=NL.

The number of resources required for an architecture that folds in both N and M dimensions is determined at block 1414. The number of rows or columns in each dimension M and N is divided by a respective factor of F. For example, if F≤MN, F is factored into $k_1$ and $k_2$, where F≥$k_1 k_2$, $k_1$≤M, $k_2$≤N, $$R_3 = \text{ceil}\left(\frac{M}{k_1}\right)\text{ceil}\left(\frac{N}{k_2}\right)L.$$

The number of resources $R_3$ that are required depends on whether the factors $k_1$ and $k_2$ evenly divide the rows or columns in dimensions M and N. It is recognized that several different factors of F may be selected at block 1414 before a minimum number of required resources is determined for the folding strategy. When F>M*N, the architecture can be fully folded in both M and N dimensions and the number of required resources $R_3$=L.

The number of resources required for an architecture that folds in the L dimension is determined at block 1416. If F is greater than L, the architecture shown in FIG. 9 may be used to fully fold the input arrays in the L dimension. The number of resources required $R_4$=M*N. However, similar to folding analyzed in blocks 1410, 1412, and 1414, the systolic array may further be folded in the M and/or N dimensions. F/L may be factorized into $k_1$, $k_2$, where $k_1$ and $k_2$ represent the folding in respective M and N dimensions as described in relation to the folding performed in block 1414. The folding strategy requiring the least number of systolic array resources is selected at block 1418 as the optimal folding.

Various embodiments may select or implement a folding strategy at different times. In one or more embodiments, a circuit design tool may select a folding strategy, based on design requirements, for a multiplication circuit to be included in a design. The design tool may then generate circuitry specificly to implement the selected folding strategy. In some other embodiments, the multiplication circuit may be configured to implement a user-selected folding strategy at runtime. In yet some other embodiments, the multiplication circuit may be configured to select and implement a folding strategy based on various multiplication parameters or design requirements.

Figure 15:
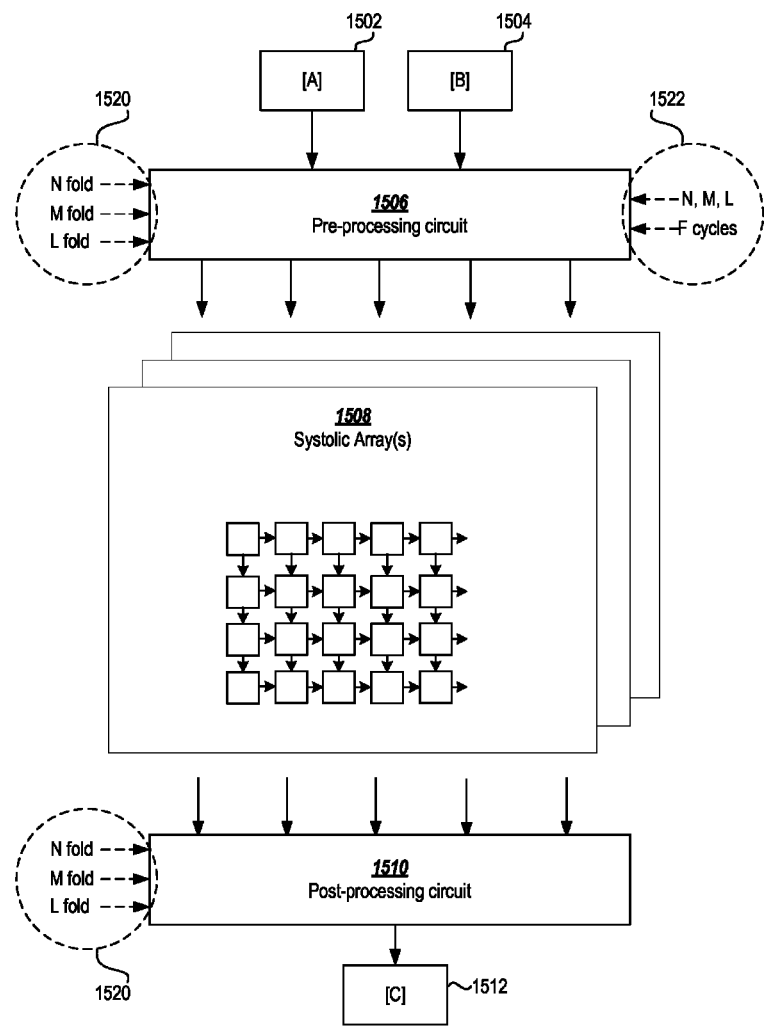
FIG. 15 illustrates input and output selection circuits arranged to partition input arrays and assemble a result matrix according to a selected folding configuration.

FIG. 15 shows a multiplication circuit having pre-processing and post-processing circuits arranged to partition input matrices A and B, and assemble a result matrix C according to a selected folding strategy. The circuit includes a plurality of the systolic arrays 1508 discussed above. Pre-processing circuit 1506 is configured to partition input arrays into sub-arrays according to a particular folding strategy and input the sub-arrays into the systolic arrays 1508 to perform multiplication of matrices A and B according the folding strategy. A post-processing circuit 1510 is configured to arrange the output of the systolic arrays 1508, according to the folding strategy, to construct result matrix C.

In one embodiment, the pre-processing and post-processing circuits (1506 and 1510) are configured to decompose matrices into a plurality of sub-matrices for processing by the plurality of systolic arrays 1508 according to folding strategy indicated by a set of folding criteria inputs 1520. In another embodiment, the preprocessing circuit is configured to determine an optimal folding strategy at runtime based on matrix multiplication parameter inputs 1522.

In addition to the above embodiments, the systolic array shown in FIG. 2 may be modified to facilitate the multiplication of complex numbers. The complex multiplication is modelled as four real multiplications and two real additions. The (i,j)th complex entry of the product matrix is modelled in terms of four constituent inner products as shown below:

$$c_{ij_{re}} = \sum_{k=1}^{L} a_{ik_{re}} b_{kj_{re}} - \sum_{k=1}^{L} a_{ik_{im}} b_{kj_{im}}$$

$$c_{ij_{im}} = \sum_{k=1}^{L} a_{ik_{re}} b_{kj_{im}} + \sum_{k=1}^{L} a_{ik_{im}} b_{kj_{re}}$$

In one embodiment, real and imaginary components are computed using a first systolic array to compute real components and a second systolic array to compute the imaginary components.

Figure 16:
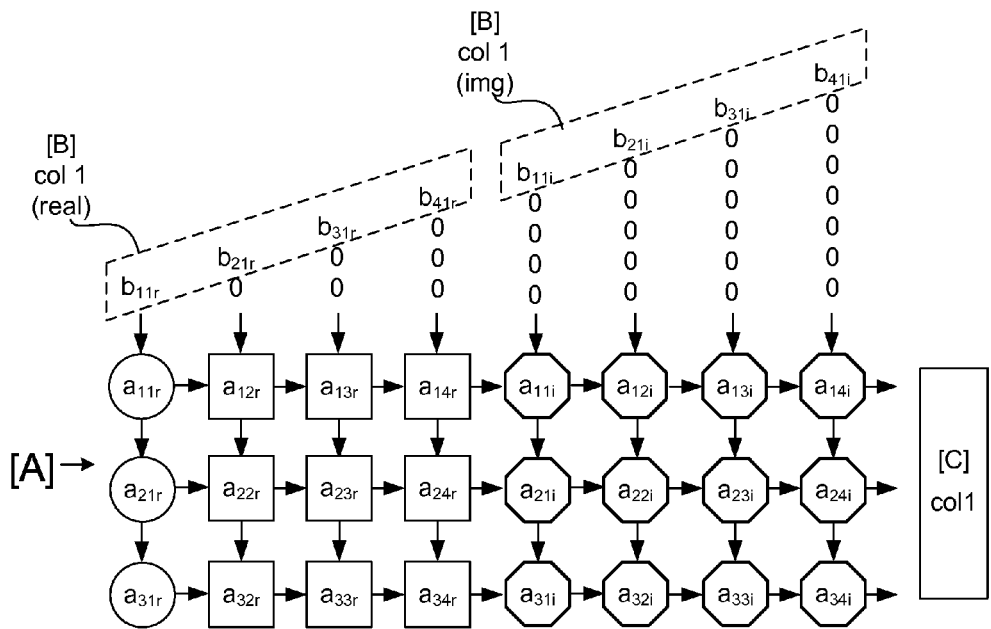
FIG. 16 shows a systolic array configured to compute the real components of complex matrix multiplication.

FIG. 16 shows the first systolic array for computing real components of the result matrix. The first systolic array includes M rows and 2*L columns of processing cells (PCs). Each row in the array includes a first number of PCs configured to compute a first dot product of real components of a column of a first matrix and a row of a second matrix similar to the systolic array shown in FIG. 2. The first number of PCs in each row are followed by a second number of PCs, which are configured to subtract a second dot product of imaginary components of the column of the first matrix and the row of the second matrix from the first dot product.

Figure 17:
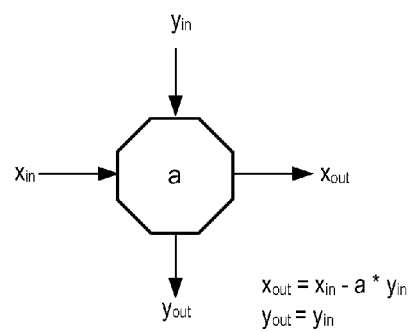
FIG. 17 illustrates the function of tail processing cells in the systolic array shown in FIG. 16.

FIG. 17 shows a tail processing cell that may be used to implement the second number of PCs in the systolic array shown in FIG. 16. The tail processing cell is similar to the internal processing cell shown in FIG. 4 except that the product (a*$y_{in}$) is subtracted from the partial dot product $x_{in}$ rather than added.

Figure 18:
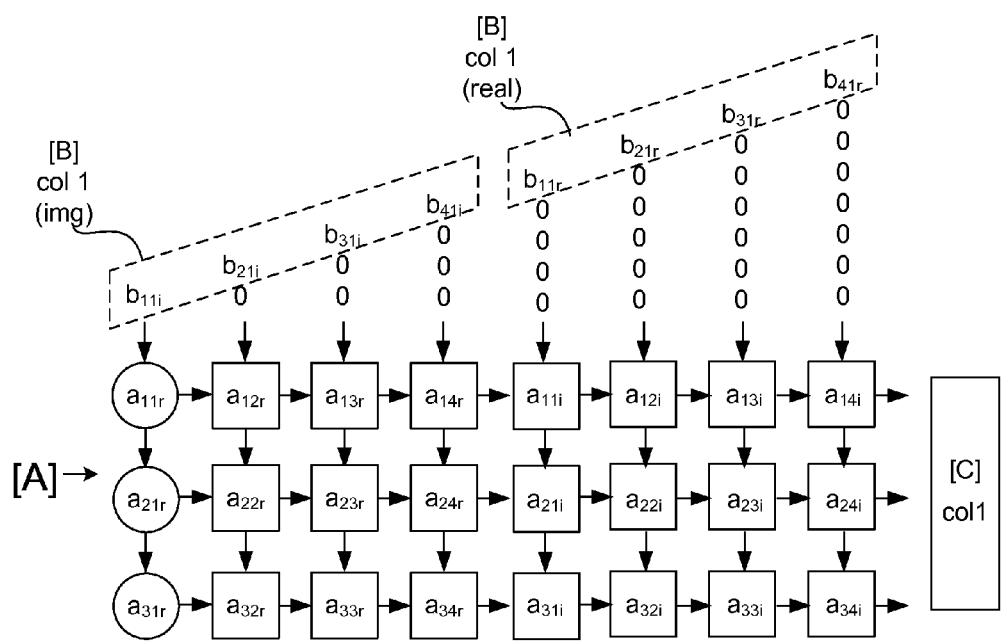
FIG. 18 shows a systolic array configured to compute the imaginary components of complex matrix multiplication.

FIG. 18 shows the second systolic array for computing imaginary components. The second systolic array includes M rows and 2*L columns of PCs arranged in rows and columns. Each row includes a first number of PCs configured to compute a first dot product of real components of the column of a first matrix and imaginary components of the row of a second matrix. The first number of PCs in each row are followed by a second number of PCs, which are configured to add a second dot product of imaginary components of the column of the first matrix and real components of the row of the second matrix to the first dot product. The first number of processing cells may be implemented using the systolic array shown in FIG. 2 with the second number of PCs having a function and structure similar to the internal cell shown in FIG. 4.

It is recognized that the systolic arrays shown in FIGS. 16 and 18 may be included in multiplication circuits utilizing multiple systolic arrays in parallel and may be similarly folded as discussed above.

Figure 19:
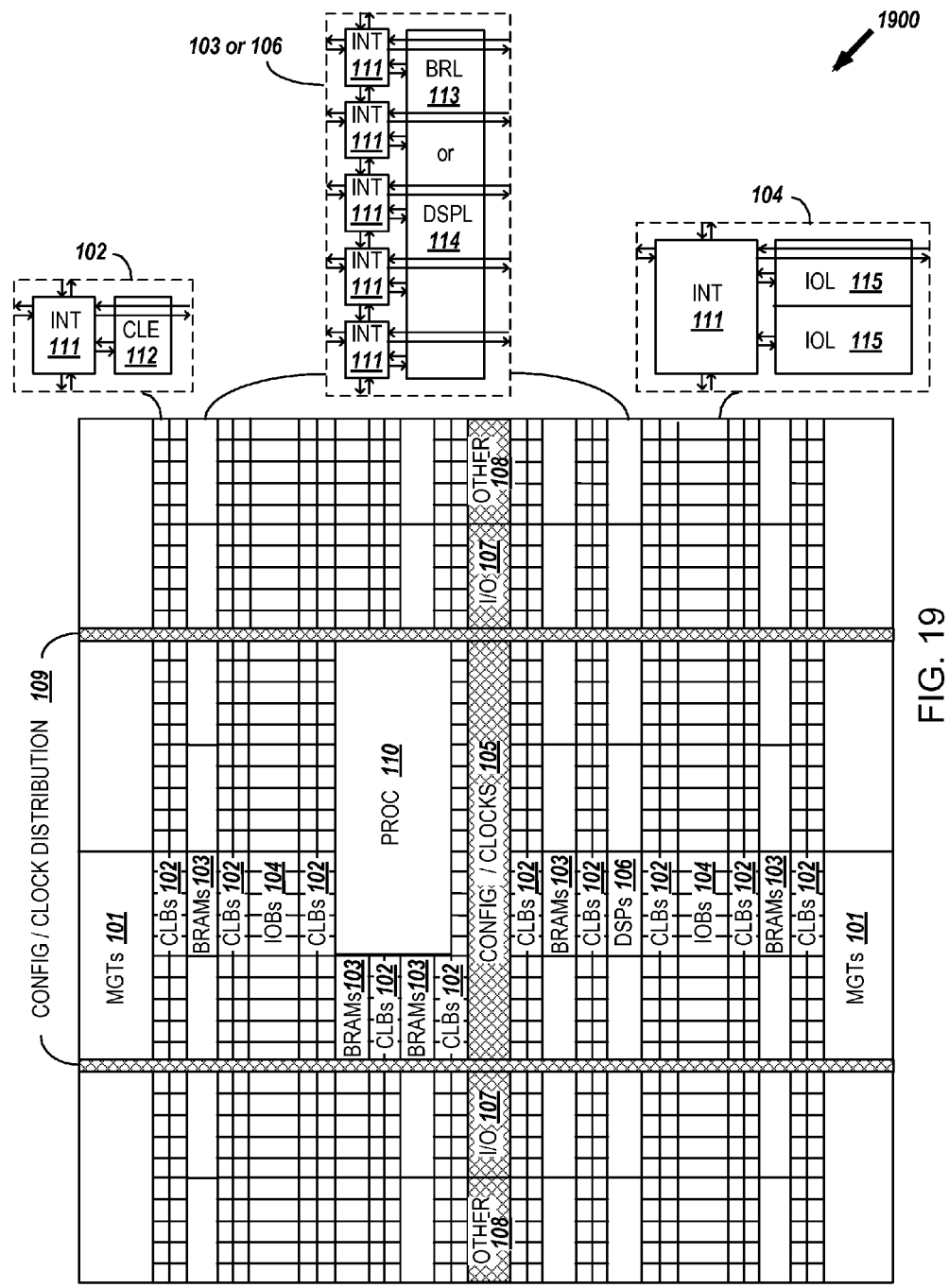
FIG. 19 illustrates a block diagram of an example programmable integrated circuit that may be used to implement a configured systolic array.

FIG. 19 is a block diagram of a programmable integrated circuit, specifically an FPGA, which may be configured to implement matrix multiplication as described herein. FPGAs and other programmable integrated circuits can include several different types of programmable logic blocks in the array. For example, FIG. 19 illustrates an FPGA architecture (100) that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107), for example, clock ports, and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element INT 111 also includes the connections to and from the programmable logic element within the same tile, as shown by the examples included at the top of FIG. 10.

For example, a CLB 102 can include a configurable logic element CLE 112 that can be programmed to implement user logic plus a single programmable interconnect element INT 111. A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element INT 111. As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 19) is used for configuration, clock, and other control logic. Horizontal areas 109 extending from this column are used to distribute the clocks and configuration signals across the breadth of the FPGA.

Some FPGAs utilizing the architecture illustrated in FIG. 19 include additional logic blocks that disrupt the regular columnar structure making up a large part of the FPGA. The additional logic blocks can be programmable blocks and/or dedicated logic. For example, the processor block PROC 110 shown in FIG. 19 spans several columns of CLBs and BRAMs.

Note that FIG. 19 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 19 are purely exemplary. For example, in an actual FPGA more than one adjacent column of CLBs is typically included wherever the CLBs appear, to facilitate the efficient implementation of user logic.

Figure 20:
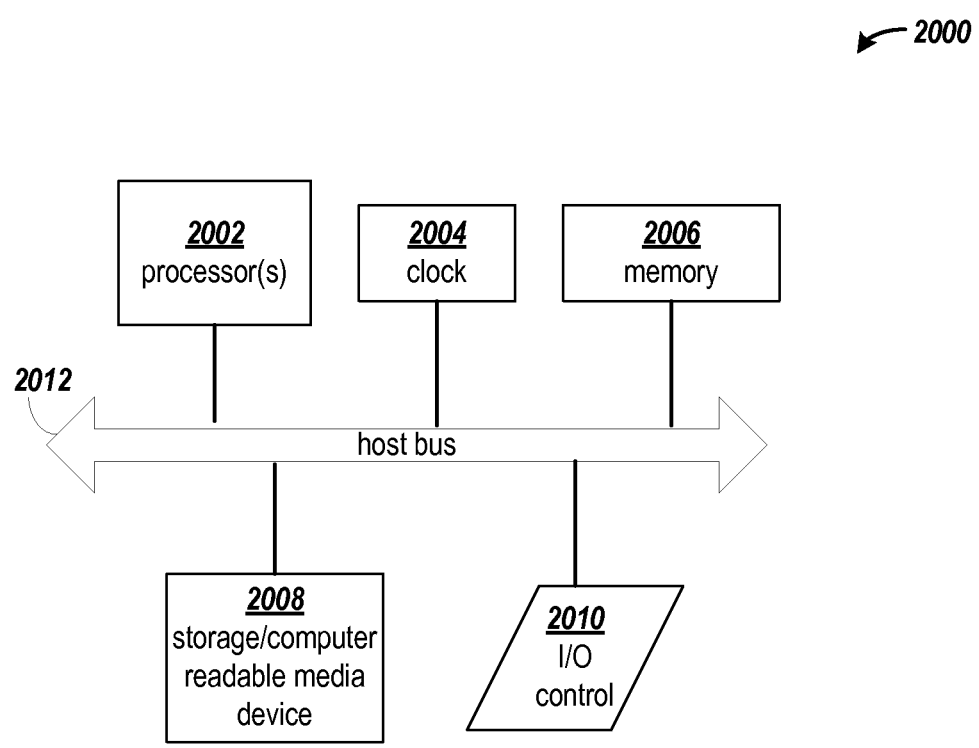
FIG. 20 illustrates a block diagram of a computing arrangement on which several processes described herein may be implemented.

FIG. 20 shows a block diagram of an example computing arrangement that may be configured to implement the processes and functions described herein. It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 2000 includes one or more processors 2002, a clock signal generator 2004, a memory unit 2006, a storage unit 2008, and an input/output control unit 2010 coupled to a host bus 2012. The arrangement 2000 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 2002 may be one or more general purpose processors, or a combination of one or more general purpose processors and suitable co-processors, or one or more specialized processors (e.g., RISC, CISC, pipelined, etc.).

The memory arrangement 2006 typically includes multiple levels of cache memory, and a main memory. The storage arrangement 2008 may include local and/or remote persistent storage such as provided by magnetic disks (not shown), flash, EPROM, or other non-volatile data storage. The storage unit may be read or read/write capable. Further, the memory 2006 and storage 2008 may be combined in a single arrangement.

The processor arrangement 2002 executes the software in storage 2008 and/or memory 2006 arrangements, reads data from and stores data to the storage 2008 and/or memory 2006 arrangements, and communicates with external devices through the input/output control arrangement 2010. These functions are synchronized by the clock signal generator 2004. The resource of the computing arrangement may be managed by either an operating system (not shown), or a hardware control unit (not shown).

The embodiments of the invention are thought to be applicable to a variety of systems and circuits for multiplication of matrices. Other aspects and embodiments will be apparent to those skilled in the art from consideration of the specification and practice of the invention disclosed herein. It is intended that the specification and illustrated embodiments be considered as examples only, with a true scope and spirit of the disclosure being indicated by the following claims.

What is claimed is:

1. A matrix multiplication circuit, comprising:
   a plurality of systolic arrays;
   a pre-processing circuit coupled to the plurality of systolic arrays and configured to:
      decompose a first input matrix into a first plurality of sub-matrices; and
      input each of the plurality of sub-matrices to at least a respective one of the plurality of systolic arrays for multiplication with a second input matrix; and
   a post-processing circuit configured to combine output of the systolic arrays into a result matrix; and
   wherein
      the pre-processing circuit is configured to decompose the second matrix into a second plurality of sub-matrices, each sub-matrix of the second plurality of sub-matrices including one or more rows of the second input matrix; and
      the pre-processing circuit is configured to input, for each systolic array of the plurality of systolic arrays, sequentially input two or more of the second plurality of sub-matrices to the systolic array.

2. The circuit of claim 1, wherein the pre-processing circuit includes a FIFO buffer for each element in at least one of the sub-matrices.

3. The circuit of claim 1, wherein each of the first plurality of sub-matrices has an equal number of rows and includes one or more columns of the first input matrix.

4. The circuit of claim 3, wherein each of the first plurality of sub-matrices is equal to a respective column of the first input matrix.

5. The circuit of claim 1, wherein the pre-processing circuit is further configured to determine a decomposition of the input matrices for multiplication using the plurality of systolic arrays based on criteria including:
   a throughput value; and
   dimensions and number of the plurality of the systolic arrays.

6. The circuit of claim 1, wherein the pre-processing circuit is further configured to decompose the first and second input matrices into sub-matrices having dimensions specified by one or more input control signals.

7. The circuit of claim 1, wherein each of the plurality of systolic arrays includes M rows and L columns of processing cells (PCs), the processing cells including boundary cells and internal cells and each row beginning with a boundary cell and continuing with L−1 internal cells;
   wherein:
      each boundary cell located in row J and column 1 ($PC_{M,1}$) is configured to:
         multiply each value Y received on a first input with a value A received on an second input from the second matrix and output a result X to $PC_{J,2}$; and
         output the value Y to $PC_{J+1,1}$;
      each internal cell located in row J and column K ($PC_{J,K}$) is configured to:
         sum the product of each value Z received on a first input and a value A received on a second input from the second matrix with the value X received on a third input from $PC_{J,K-1}$, and output a result $X_{out}$ to $PC_{J,K+1}$; and
         output the value Z to $PC_{J+1,K}$.

8. The circuit of claim 1, wherein each of the plurality of systolic arrays includes M rows and L columns of processing cells, each processing cell located in row J and column K ($PC_{J,K}$) being configured to:
   accumulate a product of a value Y received on a first input multiplied with a value X received on a second input;
   output the value X to $PC_{J,K+1}$; and
   output the value Y to $PC_{J+1,K}$.

9. The circuit of claim 1, wherein:
   the first and second input matrices include complex numbers; and
   the plurality of systolic arrays are configured to produce real values of the product of the first and second input matrices; and
   the circuit includes a second plurality of systolic arrays configured to produce imaginary values of the product of the first and second input matrices.

10. The circuit of claim 9, wherein:
    the pre-processing circuit is further configured to:
       input each of the plurality of sub-matrices to at least a respective one of the second plurality of systolic arrays for multiplication with the second input matrix; and
    the post-processing circuit is configured to combine output of the first mentioned and second plurality of systolic arrays into a result matrix.

11. A method of generating a multiplication circuit, comprising
    selecting a decomposition of first and second input matrices into sub-matrices based on criteria including a throughput value and dimensions of the first and second input matrixes, the selecting of the decomposition of the first and second input matrices, includes performing the steps of:
  determining numbers of resources needed to implement one or more systolic arrays to exhibit a throughput greater than or equal to the throughput value for a plurality of decompositions, respectively; and
  selecting one of the plurality of respective decompositions having a lowest of the determined numbers of resources;
generating the one or more systolic arrays for multiplication of matrices;
generating a pre-processing circuit that is configured to:
  decompose the first and second input matrices into a set of sub-matrices according to the selected decomposition; and
  input the set of sub-matrices to the one or more systolic arrays according to the selected decomposition of sub-matrices; and
generating a post-processing circuit configured to construct a result matrix from the output of the one or more systolic arrays according to the selected decomposition of sub-matrices.

12. The method of claim 11, wherein
the first matrix has dimensions M×L;
the second matrix has dimensions L×N; and
the plurality of decompositions includes:
  a first decomposition of the first matrix along the M dimension;
  a second decomposition of the second matrix along the N dimension; and
  a third decomposition of the first matrix along the M dimension and of the second matrix along the N dimension.

13. The method of claim 12, wherein the plurality of decompositions includes a fourth decomposition of each of the first and second matrices along the L dimension.

* * * * *